2,934,536

NEW HALOGENO PYRIDAZINES AND PROCESS FOR PREPARING SAME

Jean Druey, Riehen, and Konrad Meier and Alexander Staehelin, Basel, Switzerland, assignors to Ciba Pharmaceutical Products Inc., Summit, N.J.

No Drawing. Application March 3, 1958
Serial No. 718,417

Claims priority, application Switzerland March 29, 1957

9 Claims. (Cl. 260—250)

This invention relates to new halogeno-pyridazines. More particularly it concerns 1-aryl-4- or 5-halogeno-3:6-dioxo-1:2:3:6-tetrahydropyridazines and 1-aryl-4:5-dihalogeno - 3:6 - dioxo - 1:2:3:4:5:6 - hexahydropyridazines, which contain in the 2-position a lower aliphatic hydrocarbon radical and processes for their manufacture. As aryl radicals there may be mentioned more especially at most binuclear aromatic radicals, preferably phenyl, which may contain substituents, for example, lower alkyl or lower alkoxy groups, halogen atoms such as chlorine, bromine, iodine or fluorine, nitro or amino groups. As lower aliphatic hydrocarbon radicals there may be mentioned more especially lower alkyl groups, such as methyl or ethyl. Halogen atoms are primarily chlorine and bromine.

The new dioxo-pyridazines may contain a furthed substituent in the 5- or 4-position and advantageously a lower aliphatic hydrocarbon radical such as a lower alkyl group.

The new compounds have analgesic activity and show also antibacterial and antifungus effect, e.g., against *Staph. aureus, Esch. coli, Epidermophyton flocci., Trichophyton interdig., Microsporum aud.* Accordingly, they can be used as medicaments or disinfectants. They are primarily useful as important intermediates in the manufacture of 1-aryl-3:6-dioxo-1:2:3:6-tetrahydropyridazines which have in 2-position a lower aliphatic hydrocarbon radical and in 4-position an amino group. The preparation of these antipyretic and sedative-hypnotic 4-amino-compounds by treating the halogen compounds of the present invention with ammonia or an amine is the subject of our copending application Serial No. 718,408 of even date herewith.

Especially valuable and representing a specific and preferred embodiment of the invention are dioxopyridazines of the formulae

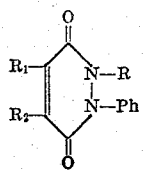

and

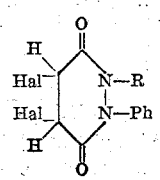

in which R stands for methyl or ethyl, one of the radicals $R_1$ and $R_2$ represents hydrogen and the other and Hal represent chlorine or bromine, and Ph represents a phenyl radical, especially 1-phenyl-2-methyl-4-chloro- or bromo-3:6-dioxo-1:2:3:6-tetrahydropyridazine, the corresponding 2-methyl- or ethyl-5-chloro- or bromo-compounds, and 1-phenyl-2-methyl- or ethyl-4:5-dichloro- or dibromo-3:6-dioxo-1:2:3:4:5:6-hexahydropyridazine.

The new hexahydro-compounds are obtained by additively combining halogen at the 4:5-double bond of 1-aryl-3:6-dioxo-1:2:3:6-tetrahydropyridazines which have in 2-position a lower aliphatic hydrocarbon radical. The reaction is preferably carried out in a diluent, such as acetic acid.

The tetrahydro-compounds are obtained by introducing in 2-position a lower aliphatic hydrocarbon radical in 1-aryl-4- or 5-halogeno-3:6-dioxo-1:2:3:6-tetdahydropyridazines, e.g. by treating the 2-unsubstituted compound with corresponding sulfuric acid diesters and isolating the resulting 2-substituted product. As sulfuric acid diesters there come into consideration more especially dimethyl and diethyl sulfate. The reaction is carried out preferably at an elevated temperature, for example between 100° and 200° C., in the presence or absence of a diluent, condensing agent or catalyst, and under atmospheric or superatmospheric pressure. The 2-substituted 1-aryl-5-halogeno-3:6-dioxo-1:2:3:6-tetrahydropyridazines can also be obtained in a second reaction step from the above corresponding 1-aryl-4:5-dihalogen-3:6-dioxo-1:2:3:4:5:6-hexahydropyridazines which have in at least one of the positions 4 and 5 a hydrogen atom and in 2-position a lower aliphatic hydrocarbon radical. The reaction is carried out with an agent splitting off hydrogen halide, preferably a strong organic base, such as for example a tertiary amine, particularly pyridine, preferably in the presence of a diluent, such as chloroform. In some cases it is possible to isolate also the 4-halogen compound as by-product. The remaining starting materials are known or can be obtained by methods in themselves known.

The starting materials used in the process may also be formed under the reaction conditions. Thus, for the reaction with the sulfuric acid diesters it is possible to use instead of the 1-aryl-3:6-dioxo-1:2:3:6-tetrahydropyridazines corresponding 3-enol ethers or acylates from which the 3:6-dioxo-1:2:3:6-tetrahydropyridazines are probably intermedially formed under the reaction conditions.

In the resulting compounds unsubstituted aryl radicals can be substituted, for example nitrated. In addition, the nitro group in compounds obtained with nitro-aryl radicals in 1-position can be reduced to the amino group in customary manner. From the amino compounds acid addition salts, e.g. therapeutically useful acid addition salts can be prepared in a manner known per se, such as for example of hydrohalic acids, sulfuric acid, phosphoric acid, nitric acid, acetic acid, propionic acid, oxalic acid, tartaric acid or malic acid or others.

The new halogeno-dioxo-hydropyridazines may be used, for example, in the form of pharmaeutical preparations which contain the active compound in admixture with a pharmaceutical organic or inorganic carrier suitable for enteral, parenteral or topical administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves, creams, or in liquid form as solutions, suspensions or emulsions. If desired, they may be sterilized and/or may contain auxiliary substances such as preserving, stabilizing, wetting or emulsifying agents, salts for regulating the osmotic pressure or buffers. They may also contain other therapeutically valuable substances.

The following examples illustrate the invention:

Example 1

50 grams of 1-phenyl-2-methyl-3:6-dioxo-1:2:3:6-tetrahydropyridazine are dissolved in the warm in 100 cc. of glacial acetic acid, and a solution of 39 grams of bromine in 50 cc. of glacial acetic acid is added. The brown solution is heated at the boil for a short time, during which it loses its color. It is allowed to stand first for 3 hours at room temperature and then for a little time at 0° C., whereby 1-phenyl-2-methyl-4:5-dibromo-1:2:3:4:5:6-hexahydro-pyridazine of the formula

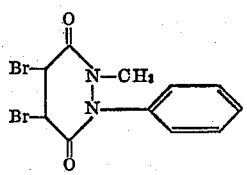

precipitates in the form of white crystals. After recrystallization from ethanol and the product melts at 177–178.5° C. with decomposition.

This compound may be converted into a 2-substituted 1-aryl-4-amino-3,6-dioxo-1,2,3,6-tetrahydro-pyridazine in the following manner:

10 grams of 1-phenyl-2-methyl-4:5-dibromo-3:6-dioxo-1:2:3:4:5:6-hexahydropyridazine are dissolved in 50 cc. of chloroform, and a solution of 7.2 grams of morpholine in 20 cc. of chloroform is added. The reaction sets in immediately. After allowing the mixture to stand for 12 hours it is washed with dilute hydrochloric acid. The chloroform solution is dried and the chloroform is completely evaporated. The residue is recrystallized from absolute ethanol. There is obtained 1-phenyl-2-methyl-4-morpholino-3:6-dioxo-1:2:3:6-tetrahydro-pyridazine of the formula

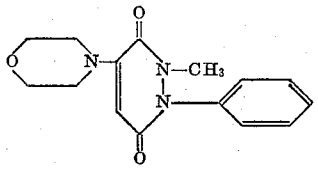

in the form of white crystals melting at 176–177.5° C.

In a similar manner there may be used for the conversion into an amino-compound 1-phenyl-2-methyl-4:5-dichloro-3:6-dioxo-1:2:3:4:5:6-hexahydro-pyridazine or 1-phenyl-2-ethyl-4:5-dichloro- or 4:5-dibromo-3:6-dioxo-1:2:3:4:5:6-hexahydro-pyridazine or the other 4:5-dihalogen compounds described hereinafter.

Example 2

20 grams of 1-phenyl-2-methyl-3:6-dioxo-1:2:3:6-tetrahydropyridazine are dissolved in 200 cc. of glacial acetic acid. Chlorine is then introduced at 90–100° C. for 1½ hours, and then the solution is evaporated, water is added, and the mixture is extracted with chloroform. The organic phase is dried over sodium sulfate and evaporated. The residue is recrystallized first from a mixture of ether and hexane and then from methanol. Crystalline 1-phenyl-2-methyl-4:5-dichloro-3:6-dioxo-1:2:3:4:5:6-hexahydropyridazine of the formula

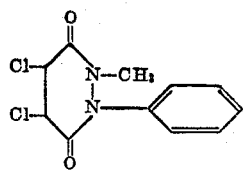

is obtained melting at 133–135° C.

Example 3

47 cc. of a molar solution of bromine in glacial acetic acid are added to 10 grams of 1-phenyl-2-ethyl-3:6-dioxo-1:2:3:6-tetrahydropyridazine. The mixture is heated at the boil for a short time, during which it loses its color. The mixture is cooled, whereupon the brominated product crystallizes out. It is purified by recrystallization from absolute ethanol. There is obtained 1-phenyl-2-ethyl-4:5-dibromo - 3:6-dioxo - 1:2:3:4:5:6-hexahydropyridazine of the formula

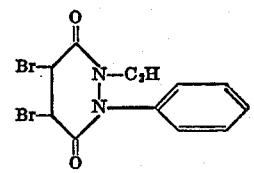

in the form of white crystals melting at 176–177° C. with decomposition.

Example 4

5 grams of 1-phenyl-5-chloro-3:6-dioxo-1:2:3:6-tetrahydropyridazine are heated with 20 cc. of dimethyl sulfate for 3½ hours at 120–130° C. The light brown solution is cooled and poured into a saturated solution of sodium carbonate (about 150 cc.). After allowing the mixture to stand for 2 days, the alkaline solution is extracted with chloroform. The chloroform solution is dried, filtered through animal charcoal and evaporated. The pale yellow crystalline residue is recrystallized from methanol. There is obtained 1-phenyl-2-methyl-5-chloro-3:6-dioxo-1:2:3:6 - tetrahydropyridazine of the formula

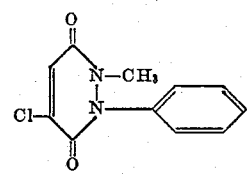

in the form of yellow-white crystals melting at 156–157° C.

This compound can be converted into a 2-substituted 1-aryl-4-amino- 3:6 - dioxo-1:2:3:6-tetrahydropyridazine as follows: 10 grams of 1-phenyl-2-methyl-5-chloro-3:6-dioxo-1:2:3:6-tetrahydropyridazine dissolved in 80 cc. of acetone area heated at the boil for ¼ hour with a solution of 7.4 grams of morpholine in 20 cc. of acetone. In a short time a part of the morpholine hydrochloride crystallizes out. The acetone solution is evaporated to remove the solvent as far as possible, a small amount of water is added, and the whole is heated until dissolution is complete. Upon cooling the reddish solution white lamellae crystallise out, which can be recrystallized from methanol. In this manner there is obtained the 1-phenyl-2-methyl - 4 - morpholino-3:6-dioxo-1:2:3:6-tetrahydropyridazine described in Example 1. In the same manner 1-phenyl-2-ethyl-5-chloro-3:6-dioxo-1:2-:3:6 - tetrahydropyridazine or the corresponding 5-bromo-compounds or other 5-halogen-compounds described hereinafter may be corrected into a 4-amino-compound.

Example 5

23.6 grams of 1-phenyl-2-ethyl-4:5-dibromo-3:6-dioxo-1:2:3:4:5:6-hexahydropyridazine are heated at the boil in 200 cc. of chloroform with 10 grams of pyridine for 6 hours. The slightly yellow chloroform solution is washed acid with dilute hydrochloric acid, dried and evaporated. The crystalline residue is recrystallized from a mixture of benzene and petroleum ether. There is obtained 1- phenyl-2-ethyl-5-bromo-3:6-dioxo-1:2:3:6 - tetrahydropyridazine of the formula

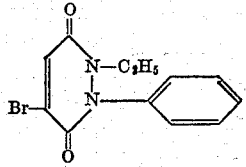

in the form of slightly yellow crystals melting at 142–144° C.

Example 6

26 grams of 1-phenyl-2-methyl-4:5-dibromo-3:6-dioxo-1:2:3:4:5:6-hexahydropyridazine are heated in 250 cc. of chloroform with 11.4 grams of pyridine at the boil for 6 hours. The pale yellow solution is washed acid with 2 N-hydrochloric acid, dried and evaporated. The crystalline residue is recrystallized from a mixture of benzene and petroleum ether. There is obtained 1-phenyl-2-methyl-5-bromo-3:6-dioxo-1:2:3:6 - tetrahydropyridazine of the formula

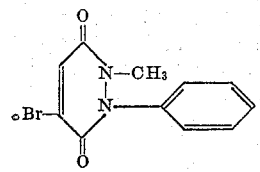

in the form of slightly yellow crystals melting at 159–161° C.

Example 7

10 grams of 1-phenyl-4-chloro-3:6-dioxo-1:2:3:6-tetrahydropyridazine are heated with 25 cc. of dimethyl sulfate for 3½ hours at 140–150° C. The brown solution is cooled and poured into 150 cc. of a saturated solution of sodium carbonate, and the whole is diluted with 100 cc. of water. The solution is stirred for a little time, and then extracted with chloroform. The chloroform extract solution is dried and evaporated. The residue is dissolved in benzene, and the solution is filtered through aluminum oxide and evaporated. The residue is crystallized from ethyl acetate. There is obtained 1-phenyl-2-methyl-4-chloro-3:6-dioxo-1:2:3:6 - tetrahydropyridazine of the formula

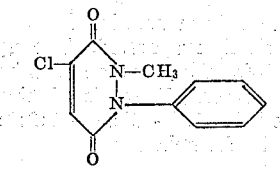

in the form of slightly yellow crystals melting at 150–152° C.

This compound can be converted into a 2-substituted 1-aryl-4-amino-3:6-dioxo-1:2:3:6-tetrahydropyridazine as follows:

2.6 grams of 1-phenyl-2-methyl-4-chloro-3:6-dioxo-1:2:3:6-tetrahydropyridazine are heated in 50 cc. of absolute ethanol with 1.9 grams of morpholine for 5 hours at the boil. The ethanol is then distilled off, and the mixture is diluted with water. The solution is rendered acid with hydrochloric acid and extracted with chloroform. The dried organic phase is evaporated, and the residue is recrystallized from ethyl acetate. There is obtained the 1-phenyl-2-methyl-4-morpholino - 3:6 - dioxo-1:2:3:6-tetrahydropyridazine described in Example 1.

Example 8

23.65 grams of 1-para-chlorophenyl-2-methyl-3:6-dioxo-1:2:3:6-tetrahydropyridazine are dissolved in 30 cc. of warm glacial acetic acid, and 100 cc. of a 1-molar solution of bromine in glacial acetic acid are added. The solution is heated to the boil for a short time, during which decolorization occurs. After cooling the mixture and allowing it to stand overnight, the product which crystallizes out is filtered off with suction, washed with a small amount of methanol and dried. The resulting 1-para-chlorophenyl-2-methyl-4:5-dibromo - 3:6 - dioxo-1:2:3:4:5:6-hexahydropyridazine of the formula

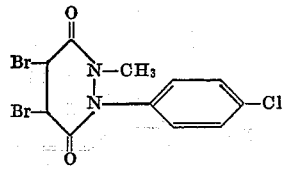

forms colorless crystals melting at 178° C. From the glacial acetic acid mother liquor a further small amount of the same product can be obtained by dilution with water. The starting material can be obtained as follows:

100 grams of 1-para-chlorophenyl-3-hydroxy-pyridazone-(6) are rapidly heated to 190–200° C. with 100 cc. of dimethylsulfate in an oil bath preheated to 150° C. The pyridazone dissolves slowly. When the boiling point is reached, the mixture boils spontaneously for a short time without the external heating. When the reaction has decreased, the mixture is allowed to cool for 15 minutes, and then the mixture is stirred into 750 cc. of a saturated solution of sodium carbonate and 750 cc. of water. After stirring the mixture overnight at room temperature, the excess of dimethylsulfate is hydrolyzed. The solution is extracted with chloroform, the chloroform extract solution is washed with sodium carbonate solution and water, dried and evaporated. The residue is recrystallized from methanol. The resulting 1-para-chlorophenyl-2-methyl-dioxo-1:2:3:6 - tetrahydropyridazine of the formula

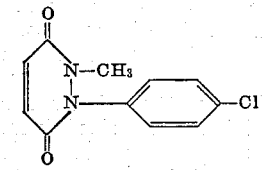

forms dense prisms melting at 145–146° C.

Example 9

21.5 grams of 1-p-chlorophenyl-2-methyl-4:5-dibromo-3:6-dioxo-1:2:3:4:5:6-hexahydropyridazine are boiled in 200 cc. of chloroform with 9 grams of pure pyridine for 6 hours under reflux. The chloroform solution is then washed with dilute hydrochloric acid and water, dried, evaporated, and the residue is recrystallized from methanol. The resulting 1-para-chloro-phenyl - 2 - methyl - 5-bromo-3:6-dioxo - 1:2:3:6 - tetrahydropyridazine of the formula

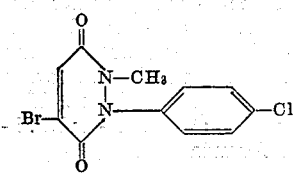

forms yellow prisms melting at 158.5–159° C.

Example 10

294 cc. of a 1-molar solution of bromine in glacial acetic acid are added to a solution of 69.4 grams of 1-m-chlorophenyl - 2 - methyl - 3:6 - dioxo - 1:2:3:6 - tetrahydropyridazine in 100 cc. of warm glacial acetic acid. The mixture is boiled for a short time, the bromine being rapidly consumed. The mixture is then poured on to ice, the precipitated 1-m-chloro-phenyl-2-methyl-4:5-dibromo-3:6-dioxo-1:2:3:4:5:6-hexahydropyridazine filtered with suction, washed with water, dissolved in chloroform, the solution washed with water, dried with sodium sulfate and diluted with chloroform to 400 cc. After the addition of 47 cc. of pure pyridine the whole is boiled under reflux for 6 hours, the chloroform solution is then washed with dilute hydrochloric acid and water, dried and evaporated. The residue is recrystallized from methanol. 1 - m - chlorophenyl - 2 - methyl - 5 - bromo - 3:6 - dioxo-1:2:3:6-tetrahydropyridazine of the formula

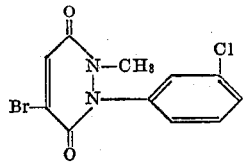

melts at 169–170°.

The starting material can be obtained as follows:

273 grams of m-chlorophenyl-hydrazine sulfate are boiled under reflux with 1.7 liters of water, 180 cc. of concentrated hydrochloric acid ($d=1.19$) and 98 grams of maleic acid anhydride for 2 hours with stirring. After cooling, the crystallizate is filtered with suction, washed with water and, for the purpose of purification, dissolved once more in 700 cc. of 2 N-caustic soda solution. The alkaline solution is filtered over Celite with active charcoal and the reaction product is then precipitated with stirring by adding 5 N-hydrochloric acid dropwise. The colorless 1-m-chlorophenyl-3-hydroxy-pyridazone-(6) is filtered with suction, washed neutral with water and dried in vacuo at 110° C. It melts at 247–248° C.

111.25 grams of 1-m-chlorophenyl-3-hydroxy-pyridazone-(6) are stirred with 150 cc. of dimethyl sulfate for 4 hours at 150–155° C. bath temperature. After cooling, the mixture is stirred with 850 cc. of saturated sodium carbonate solution and 750 cc. of water overnight at room temperature. The homogeneous solution is extracted four times with ether to remove the O-methyl derivative.

The solution is then extracted four times with chloroform. After distilling off the chloroform, the crystalline residue is recrystallized from methanol. The 1-m-chlorophenyl - 2 - methyl - 3:6 - dioxo - 1:2:3:6 - tetrahydropyridazine melts at 139–141° C.

Example 11

21.6 grams of 1-para-tolyl-2-methyl-3:6-dioxo-1:2:3:6-tetrahydropyridazine are dissolved in 20 cc. of hot glacial acetic acid and added to 100 cc. of a 1-molar solution of bromo-glacial acetic acid. After boiling for a short time the solution loses its color. It is poured hot on to ice, the precipitating 1-para-tolyl-2-methyl-4:5-dibromo-3:6 - dioxo - 1:2:3:4:5:6 - hexahydropyridazine is filtered with suction, washed with water, dissolved in chloroform, the solution (350 cc.) dried and after the addition of 16 cc. of pure pyridine boiled under reflux for 6 hours. The chloroform solution is then washed neutral with dilute hydrochloric acid and water, dried, evaporated and the residue recrystallized from methanol. The 1-para-tolyl-2-methyl - 5 - bromo - 3:6 - dioxo - 1:2:3:6 - tetrahydropyridazine of the formula

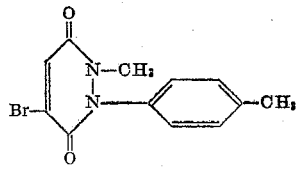

forms pale yellow prisms melting at 170–171° C.

The starting material can be prepared as follows:

171 grams of para-tolyl-hydrazine sulfate are boiled under reflux with 1.7 liters of water, 180 cc. of concentrated hydrochloric acid and 98 grams of maleic acid anhydride for 2 hours with stirring. After cooling, the mixture is filtered with suction, the crystallizate purified by being dissolved in dilute caustic soda solution, the solution being filtered with charcoal and precipitated with 5 N-hydrochloric acid. The 1-para-tolyl-3-hydroxy-pyridazine-(6) melts at 230° C.

101 grams of 1-para-tolyl-3-hydroxy-pyridazone-(6) are stirred for 5 hours with 150 cc. of dimethyl sulfate at 145–150° C. The mixture is hydrolyzed overnight with excess sodium carbonate solution. After being extracted with ether to remove any by-product, 1-para-tolyl-2-methyl - 3:6 - dioxo - 1:2:3:6 - tetrahydropyridazine is extracted with chloroform and crystallizes from a mixture of acetone and ether in the form of pale yellow crystals melting at 132–134° C.

Example 12

66 cc. of a molar solution of bromine in glacial acetic acid are added to 17.2 grams of 1-para-nitrophenyl-2-ethyl-3:6-dioxo-1:2:3:6-tetrahydropyridazine. The mixture is heated to the boil for a short time and after a few minutes loses its color. The solution is cooled and the brominated product crystallizes out. For the purpose of purification it is recrystallized from absolute ethanol. There is obtained 1-para-nitro-phenyl-2-ethyl-4:5-dibromo-3:6-dioxo-1:2:3:4:5:6-hexahydropyridazine of the formula

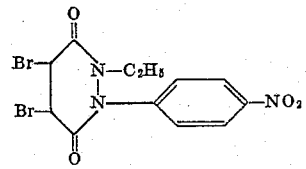

in crystalline form melting at 150–152° C.

The 1-para-nitrophenyl-2-ethyl-3:6-dioxo-1:2:3:6-tetrahydropyridazine used as starting material is prepared as follows:

30 cc. of nitric acid are added dropwise to 27.8 grams of 1-phenyl-2-ethyl-3:6-dioxo-1:2:3:6-tetrahydropyridazine in 60 cc. of concentrated sulfuric acid between 15 and 25° C. with stirring. The solution is cooled, stirred first for 2 hours at 5–10° C., then for another 2 hours at room temperature, then poured on to 800 cc. of ice water and after a few hours extracted four times with chloroform. The chloroform solution is washed with water, dried and completely evaporated. The crystalline residue is recrystallized from benzene and a mixture of benzene and petroleum ether. There is obtained 1-para-nitrophenyl - 2 - ethyl - 3:6 - dioxo - 1:2:3:6 - tetrahydropyridazine of the formula

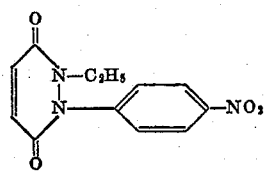

in crystalline form melting at 179–181° C.

Example 13

5 cc. of nitric acid are added dropwise to 5 grams of 1 - phenyl - 2 - methyl - 5 - bromo - 3:6 - dioxo - 1:2:3:6-tetrahydropyridazine in 15 cc. of concentrated sulfuric acid at 5–10° C. with stirring. This temperature is maintained for another hour, then the mixture is stirred for 2 hours at room temperature and poured on to ice water, the product crystallizing out. The aqueous mixture is extracted with chloroform, the organic phase dried and completely evaporated. The residue is recrystallized from a mixture of benzene and petroleum ether. There is obtained 1-para-nitrophenyl-2-methyl-5-bromo-3:6-dioxo-1:2:3:6-tetrahydropyridazine of the formula

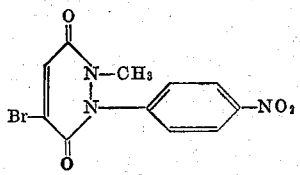

in the form of slightly yellow crystals melting at 199–201° C.

*Example 14*

10 grams of 1-para-nitrophenyl-2-methyl-3:6-dioxo-1:2:3:6-tetrahydropyridazine are dissolved hot in 30 cc. of glacial acetic acid, 65 cc. of a molar solution of bromine in glacial acetic acid are added and the whole heated for 10 minutes at the boil, the solution partially losing its color. After 2 hours the mixture is cooled, the crystalline product filtered with suction and water added to the filtrate, a further portion crystallizing out. There is obtained 1-para-nitrophenyl-2-methyl-4:5-dibromo-3:6-dioxo-1:2:3:4:5:6-hexahydropyridazine of the formula

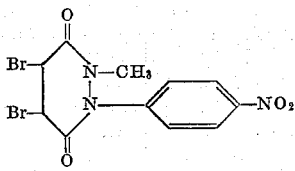

in the form of white crystals melting at 183.5–184.5° C.

The 1-para-nitrophenyl-2-methyl-3:6-dioxo-1:2:3:6-tetrahydropyridazine used as starting material can be prepared as follows:

100 cc. of nitric acid are added dropwise with stirring to 100 grams of 1-phenyl-2-methyl-3:6-dioxo-1:2:3:6-tetrahydropyridazine in 200 cc. of concentrated sulfuric acid at 15–25° C. The mixture is stirred for 2 hours at 5–10° C. and for another 3 hours at room temperature, a slight increase in temperature (30° C.) being perceptible. The solution is poured on to 2.5 liters of ice water, stirred for 8 hours and extracted several times with chloroform. The chloroform solution is first washed neutral, dried and completely evaporated. The crystalline residue is recrystallized from ethyl acetate. There is obtained 1-para-nitrophenyl-2-methyl-3:6-dioxo-1:2:3:6-tetrahydropyridazine of the formula

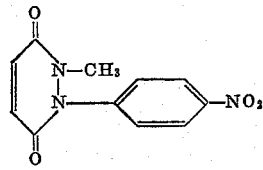

in the form of faintly yellow crystals melting at 185–186° C.

*Example 15*

16 grams of 1-para-nitrophenyl-2-methyl-4:5-dibromo-3:6-dioxo-1:2:3:4:5:6-hexahydropyridazine are heated at the boil in 150 cc. of chloroform and 6.2 grams of pyridine for 6 hours. The cooled chloroform solution is washed with 100 cc. of dilute hydrochloric acid and water, dried and completely evaporated. The crystalline residue is recrystallized from a mixture of benzene and petroleum ether. There is obtained 1-para-nitrophenyl-2-methyl-5-bromo-3:6-dioxo-1:2:3:6-tetrahydropyridazine of the formula

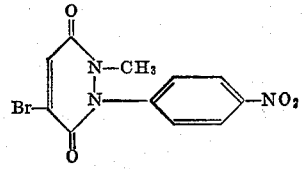

in the form of slightly yellow crystals melting at 199–201° C.

From the mother liquor of crystallization a second product is isolated which can be recrystallized from a mixture of glacial acetic acid and water. There is obtained as by-product 1-para-nitrophenyl-2-methyl-4-bromo-3:6-dioxo-1:2:3:6-tetrahydropyridazine of the formula

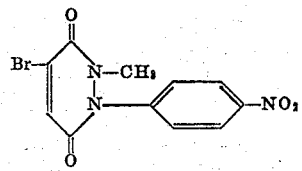

melting at 216–218° C.

The 1-para-nitrophenyl-2-methyl-5-bromo-3:6-dioxo-1:2:3:6-tetrahydropyridazine so obtained can be converted into the corresponding amino compound as follows:

7.8 grams of 1-para-nitrophenyl-2-methyl-5-bromo-3:6-dioxo-1:2:3:6-tetrahydropyridazine are hydrogenated in 200 cc. of ethyl acetate with 6 grams of Raney nickel which are added in 2 portions. After 11 hours at 45° C. the theoretical quantity of hydrogen (1.73 liters) is taken up. The catalyst is filtered off and the filtrate completely evaporated. The crude base, which melts at 149–152° C. when recrystallized from absolute ethanol, is dissolved hot in absolute ethanol, rendered strongly acid with alcoholic hydrochloric acid and cooled. The crystallized hydrochloride is filtered with suction and recrystallized twice from 80% ethanol. There is obtained 1-para-aminophenyl - 2 - methyl - 5 - bromo - 3:6 - dioxo-1:2:3:6-tetrahydropyridazine hydrochloride of the formula

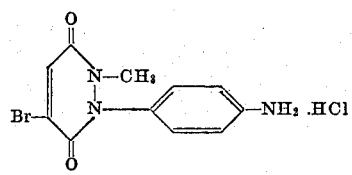

melting at 258–261° C. with decomposition.

*Example 16*

23 grams of 1-para-tolyl-2-ethyl-3:6-dioxo-1:2:3:6-tetrahydropyridazine are reacted as described in Example 3 in glacial acetic acid with an equimolecular quantity of bromine and the resulting 1-para-tolyl-2-ethyl-4:5-dibromo - 3:6 - dioxo - 1:2:3:4:5:6 - hexahydropyridazine is boiled in chloroform with pyridine for the purpose of splitting off hydrobromide. After working up in an analogous manner, there is obtained 1-para-tolyl-2-ethyl-5-bromo-3:6-dioxo-1:2:3:6-tetrahydropyridazine of the formula

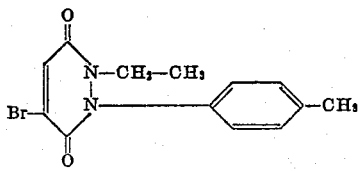

which crystallizes from methanol in the form of pale yellow needles melting at 168–169° C.

The 1-para-tolyl-2-ethyl-3:6-dioxo-1:2:3:6-tetrahydropyridazine used as starting material can be prepared as follows:

101 grams of 1-para-tolyl-3-hydroxy-pyridazone-(6) are stirred with 150 cc. of diethyl sulfate for 3 hours at 165–170° C. By stirring the reaction mixture with excess sodium carbonate solution at room temperature overnight, the excess diethyl sulfate is hydrolyzed. By extraction with ether there is obtained a mixture of O-ethyl- and N-ethyl derivative from the aqueous solution. The mixture is then extracted with chloroform, practically pure 1-para-tolyl-2-ethyl-3:6-dioxo-1:2:3:6-tetrahydropyridazine precipitating. The product crystallizes from acetone in the form of yellowish prisms melting at 119–121° C.

*Example 17*

18.55 grams of 1-para-anisyl-2-methyl-3:6-dioxo-1:2:3:6-tetrahydropyridazine are brominated in glacial acetic acid as described in Example 3, and by boiling the resulting crude 1-para-anisyl-2-methyl-4:5-dibromo-3:6-dioxo-1:2:3:4:5:6-hexahydropyridazine with pyridine in chloroform hydrogen bromide is split off. By recrystallizing the reaction product several times from a mixture of acetone and ether there is obtained 1-para-anisyl-2-methyl - 5 - bromo - 3:6 - dioxo - 1:2:3:6 - tetrahydropyridazine of the formula

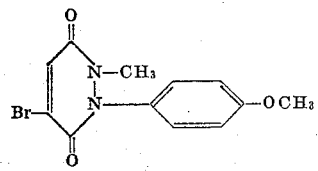

melting at 155–157° C.

The 1-para-anisyl-2-methyl-3:6-dioxo-1:2:3:6-tetrahydropyridazine used as starting material can be prepared as follows:

From 246 grams (2 mols) of para-anisidine there is obtained by known methods crude, moist para-methoxyphenyl-hydrazine hydrochloride which is squeezed out as far as possible. The latter is boiled under reflux in 3.4 liters of water with 300 cc. of concentrated hydrochloric acid and 196 grams of maleic acid anhydride for 2 hours. The crude product is purified by being reprecipitated twice from an alkaline solution and dried in vacuo. 1-para-anisyl-3-hydroxy-pyridazone-(6) melts at 240–241° C.

50 grams of this product are heated with 100 cc. of dimethyl sulfate for 5 hours at 140–150° C. The reaction mixture is hydrolyzed with excess sodium carbonate solution and the methylation product is extracted from the solution with chloroform. 1-para-anisyl-2-methyl - 3:6 - dioxo - 1:2:3:6 - tetrahydropyridazine crystallizes from a mixture of methanol and ether in the form of yellowish prisms melting at 139–140° C.

What is claimed is:

1. 1 - R - 4:5 - dihalogeno - 3:6 - dioxo - 1:2:3:4:5:6-hexahydropyridazine having a lower alkyl radical in 2-position, and in which R stands for a member selected from the group consisting of unsubstituted phenyl, lower alkyl phenyl, lower alkoxy-phenyl, halogeno-phenyl, nitro-phenyl and amino-phenyl.

2. 1 - R - 4 - halogeno - 5 - $R_1$ - 3:6 - dioxo - 1:2:3:6-tetrahydropyridazine having a lower alkyl radical in the 2-position and in which R stands for a member selected from the group consisting of methyl phenyl, methoxy phenyl, chlorophenyl, nitrophenyl and amino phenyl and wherein $R_1$ is a member selected from the group consisting of hydrogen and lower alkyl.

3. 1 - R - 5 - halogeno - 4 - $R_1$ - 3:6 - dioxo - 1:2:3:6-tetrahydropyridazine having a lower alkyl radical in the 2-position and in which R stands for a member selected from the group consisting of methyl phenyl, methoxy phenyl, chlorophenyl, nitrophenyl and amino phenyl and wherein $R_1$ is a member selected from the group consisting of hydrogen and lower alkyl.

4. 1 - phenyl - 2 - methyl - 4:5 - dibromo - 3:6 - dioxo-1:2:3:4:5:6-hexahydropyridazine.

5. 1 - phenyl - 2 - ethyl - 4:5 - dibromo - 3:6 - dioxo-1:2:3:4:5:6-hexahydropyridazine.

6. 1 - phenyl - 2 - methyl - 4:5 - dichloro - 3:6 - dioxo-1:2:3:4:5:6-hexahydropyridazine.

7. 1 - phenyl - 2 - ethyl - 4:5 - dichloro - 3:6 - dioxo-1:2:3:4:5:6-hexahydropyridazine.

8. 1 - para - chlorophenyl - 2 - methyl - 4:5 - dibromo-3:6-dioxo-1:2:3:4:5:6-hexahydropyridazine.

9. 1 - para - chlorophenyl - 2 - methyl - 5 - bromo-3:6-dioxo-1:2:3:6-tetrahydropyridazine.

References Cited in the file of this patent

Druey et al.: Helvetica Chimica Acta, vol. 37, pp. 513 and 528–529 (1954).

UNITED STATES PATENT OFFICE
CERTIFICATION OF CORRECTION

Patent No. 2,934,536                April 26, 1960

Jean Druey et al.

It is hereby certified that error appears in the above numbered patent requiring correction and that the said Letters Patent should read as corrected below.

Column 1, line 35, for "flocci." read -- flocc. --; column 2, line 13, for "-tetdahydropy-" read -- -tetrahydropy- --; column 3, line 52, for "or 4:5-" read -- or -4:5- --; column 4, lines 11 to 20, the formula should appear as shown below instead of as in the patent:

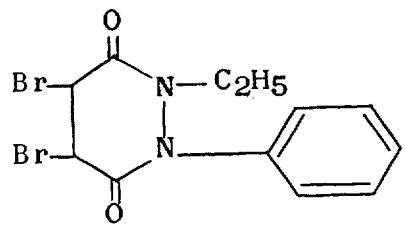

same column 4, line 52, for "area" read -- are --; line 63, for "1:2-:3:6" read -- 1:2:3:6 --.

Signed and sealed this 18th day of April 1961.

(SEAL)
Attest:

ERNEST W. SWIDER                DAVID L. LADD
Attesting Officer                Commissioner of Patents